US009744922B2

(12) United States Patent
Ostermeier et al.

(10) Patent No.: US 9,744,922 B2
(45) Date of Patent: Aug. 29, 2017

(54) FASTENING DEVICE FOR A HEAT SHIELD AND METHOD TO PRODUCE THE SAME

(71) Applicant: REINZ-DICHTUNGS-GMBH, Neu-Ulm (DE)

(72) Inventors: Helmut Ostermeier, Tiefenbach (DE); Marc Sauter, Biberachzell (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 0 days.

(21) Appl. No.: 14/392,362

(22) PCT Filed: Jul. 28, 2014

(86) PCT No.: PCT/EP2014/066202
§ 371 (c)(1),
(2) Date: Jan. 14, 2016

(87) PCT Pub. No.: WO2015/011295
PCT Pub. Date: Jan. 29, 2015

(65) Prior Publication Data
US 2016/0207477 A1 Jul. 21, 2016

(30) Foreign Application Priority Data
Jul. 26, 2013 (DE) .................... 20 2013 006 767 U

(51) Int. Cl.
*B60R 13/08* (2006.01)
*F02B 77/11* (2006.01)
(Continued)

(52) U.S. Cl.
CPC ...... *B60R 13/0876* (2013.01); *F01N 13/1855* (2013.01); *F01N 13/1872* (2013.01);
(Continued)

(58) Field of Classification Search
CPC ............ B60R 13/0838; B60R 13/0846; B60R 13/0876; B60Y 2410/12; B60Y 2410/114;
(Continued)

(56) References Cited

U.S. PATENT DOCUMENTS 3,756,551 A 9/1973 Bishop
4,183,992 A * 1/1980 Tsubaki ................ F01N 13/102
442/210
(Continued)

FOREIGN PATENT DOCUMENTS

DE 3733287 A1 * 4/1989 ....... B29C 45/14344
DE 29701296 U1 * 4/1997 ............. F01N 13/14
(Continued)

OTHER PUBLICATIONS

European Patent Office, International Search Report and Written Opinion of PCT/EP2014/066202, Nov. 18, 2014, 9 pages, Rijswijk, Netherlands.

*Primary Examiner* — Glenn Dayoan
*Assistant Examiner* — Paul Chenevert
(74) *Attorney, Agent, or Firm* — Marshall & Melhorn, LLC

(57) ABSTRACT

A heat shield for shielding of hot areas of a combustion engine. The heat shield has at least one metal sheet layer with a first and a second surface. The at least one metal sheet layer has at least one passage opening for the passage of a fastening element. The layer also has a sleeve which passes through the passage opening. The heat shield further has a decoupling element from flexible material arranged between a circumferential edge of the passage opening and the sleeve. The decoupling element and the sleeve each have a) an annular shank area, which penetrates the passage opening, b) a first collar, which on the first surface extends radially outward relative to the circumferential edge of the passage opening, and c) a second collar, which extends
(Continued)

adjacent to the second surface radially outward relative to the circumferential edge of the passage opening.

14 Claims, 11 Drawing Sheets

(51) Int. Cl.
*F01N 13/18* (2010.01)
*F01N 13/14* (2010.01)

(52) U.S. Cl.
CPC ......... *F02B 77/11* (2013.01); *B60Y 2410/114* (2013.01); *B60Y 2410/12* (2013.01); *F01N 13/14* (2013.01); *F01N 2260/20* (2013.01)

(58) Field of Classification Search
CPC .. F01N 13/14; F01N 13/1855; F01N 13/1872; F01N 2260/20; F02B 77/11
See application file for complete search history.

(56) References Cited

U.S. PATENT DOCUMENTS

| | | | |
|---|---|---|---|
| 4,901,395 A * | 2/1990 | Semru | B60R 13/0846 16/2.2 |
| 7,284,748 B2 | 10/2007 | Mishima | |
| 7,784,585 B2 | 8/2010 | Greenwood | |
| 7,946,380 B2 * | 5/2011 | Yamamoto | F01N 13/14 181/204 |
| 8,336,662 B2 * | 12/2012 | Kakuta | B62M 7/02 180/219 |
| 8,507,067 B2 * | 8/2013 | Krus | B60R 13/0876 181/207 |
| 8,870,510 B2 | 10/2014 | Greenwood | |
| 9,016,427 B2 * | 4/2015 | Yazaki | B62J 23/00 180/309 |
| 9,499,226 B2 * | 11/2016 | Senda | F01N 13/082 |
| 2002/0154484 A1 * | 10/2002 | Gorlich | B60R 13/083 361/704 |
| 2007/0252315 A1 | 11/2007 | Mishima | |
| 2007/0252316 A1 | 11/2007 | Mishima | |
| 2015/0043992 A1 | 2/2015 | Greenwood | |

FOREIGN PATENT DOCUMENTS

| | | | | |
|---|---|---|---|---|
| DE | 10049765 A1 * | 5/2002 | ......... | B60R 13/0876 |
| DE | 102007030983 A1 * | 1/2009 | ............. | F02B 77/11 |
| DE | 202011001963 U1 | 1/2012 | | |
| DE | 202011109219 U1 | 12/2012 | | |
| EP | 1548246 A2 | 6/2005 | | |
| FR | 2702692 A1 * | 9/1994 | ......... | B60R 13/0876 |
| FR | 1561921 A1 * | 8/2005 | ........... | F01N 13/008 |
| JP | S5732234 U | 2/1982 | | |
| JP | 2008188923 A | 8/2008 | | |
| KR | 20130040289 A | 4/2013 | | |
| WO | 2005019714 A2 | 3/2005 | | |
| WO | 2010062828 A1 | 6/2010 | | |

* cited by examiner

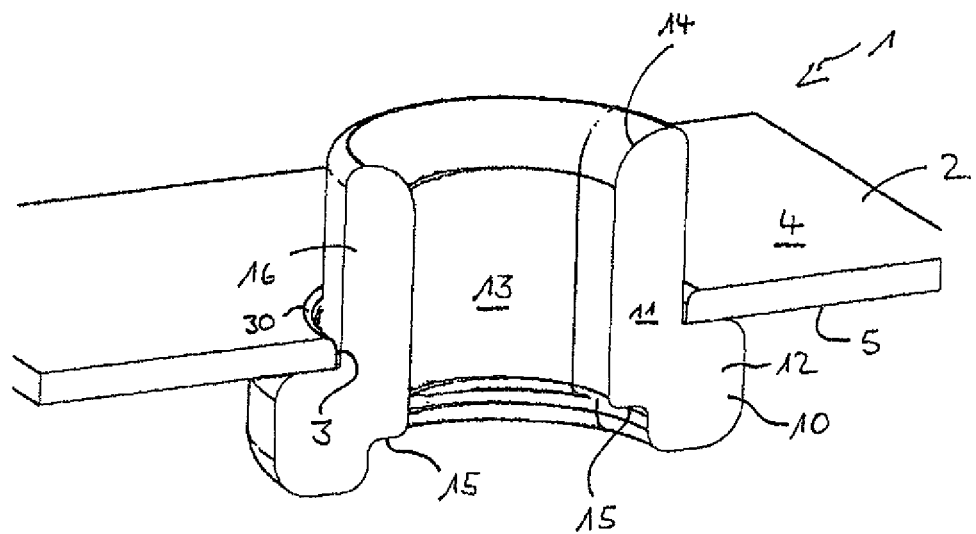
Fig. 1-a
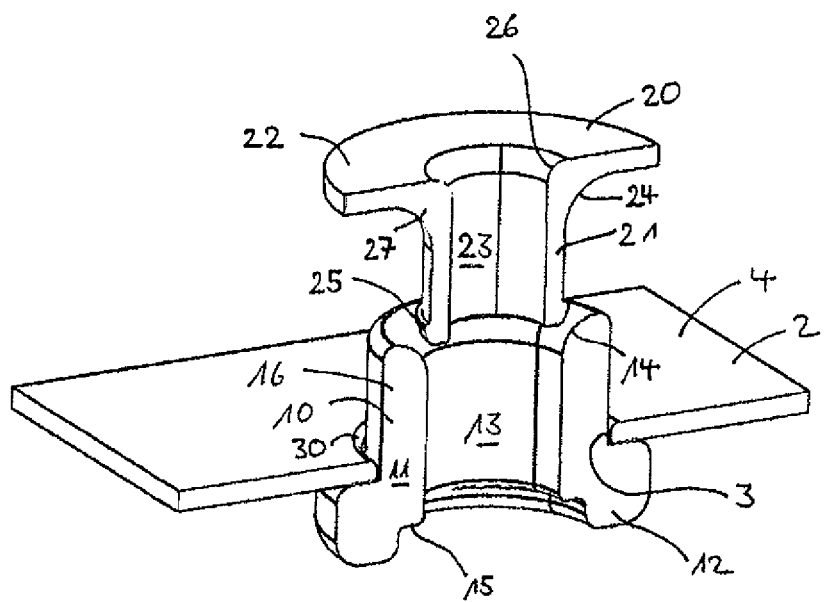
Fig. 1-b

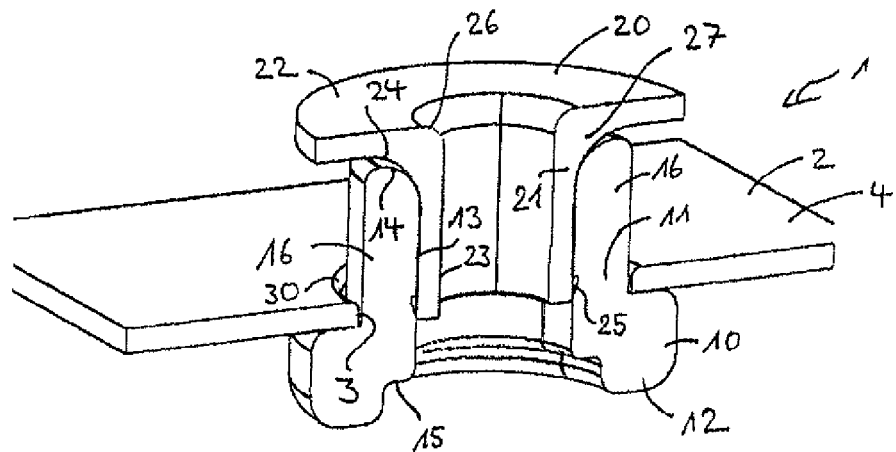
Fig. 1-c
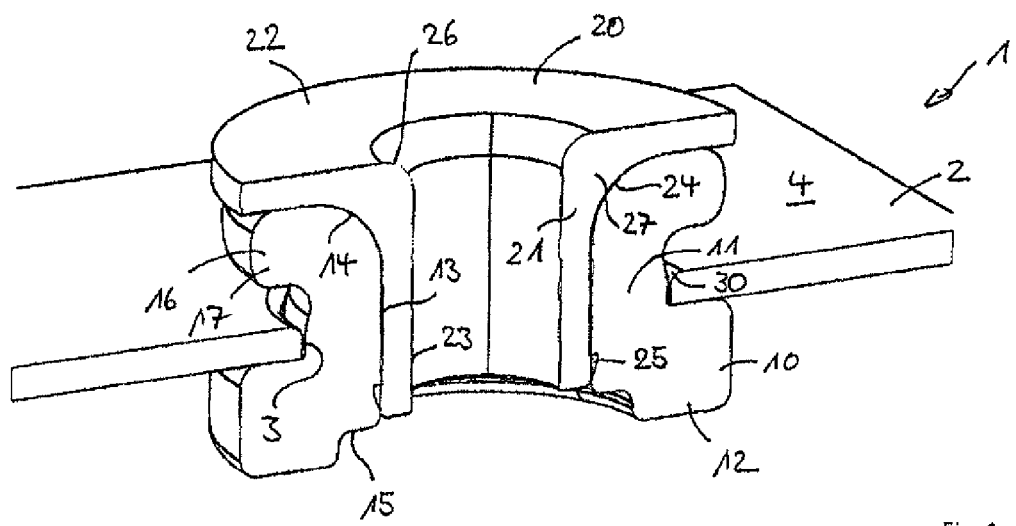
Fig. 1-d

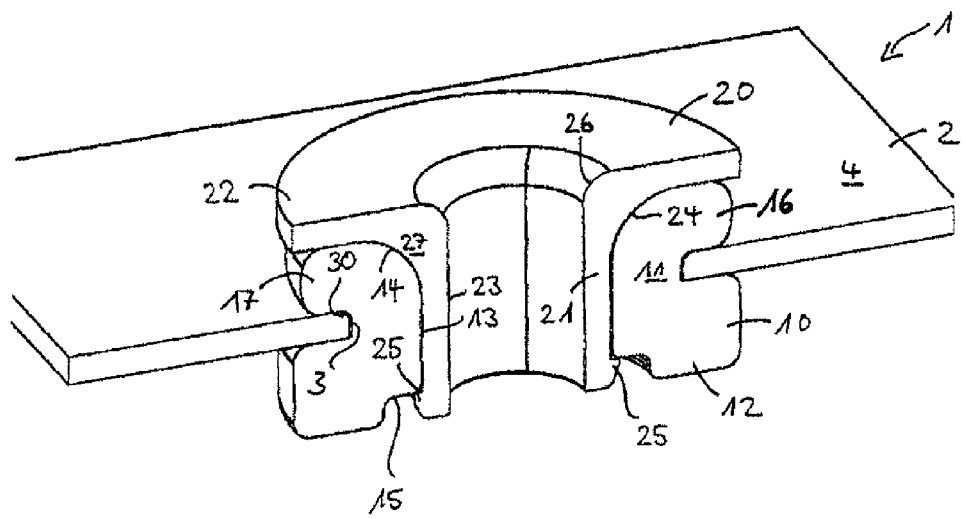
Fig. 1-e
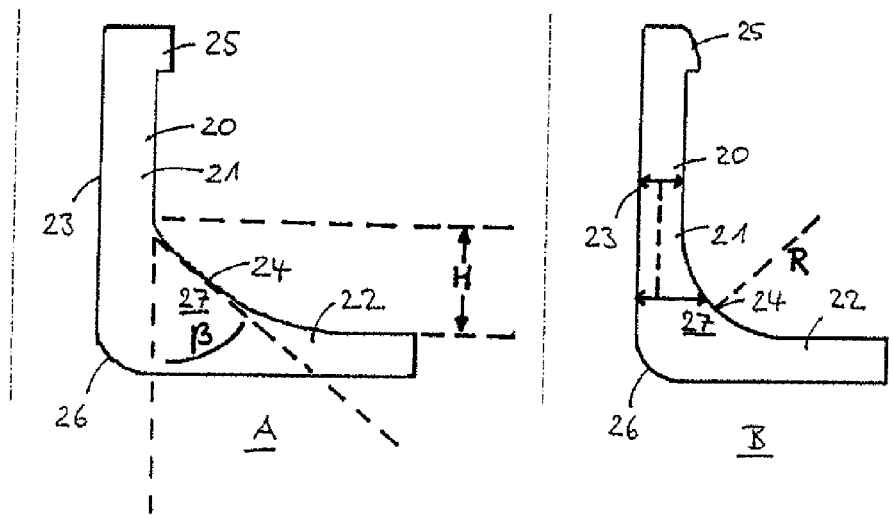
Fig. 2

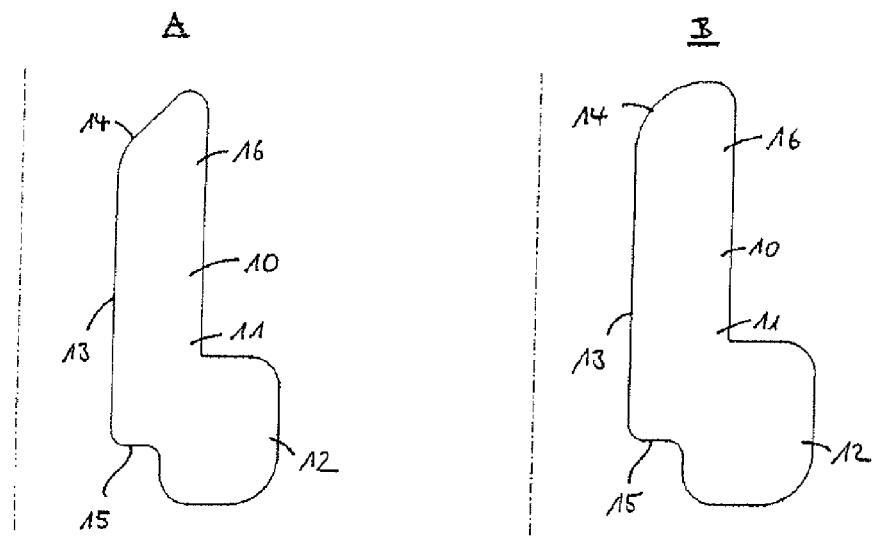
Fig. 3
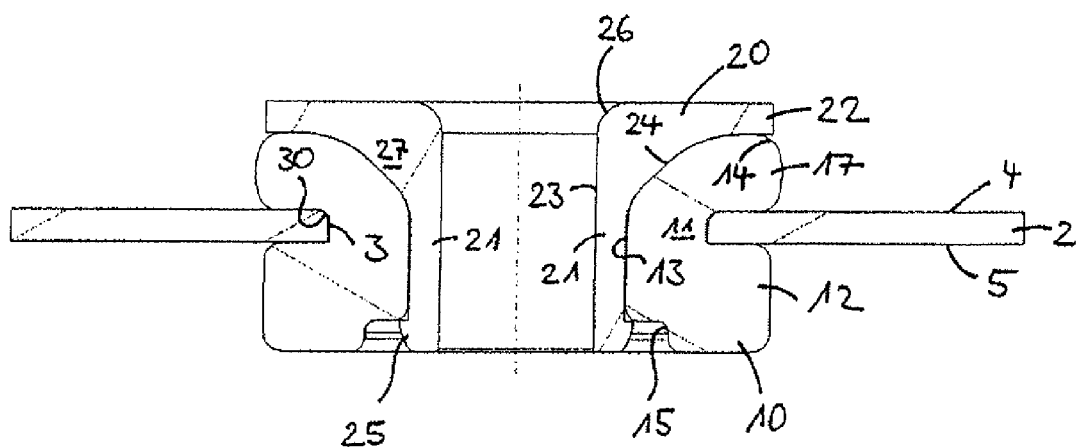
Fig. 4-a

Fig. 4-b

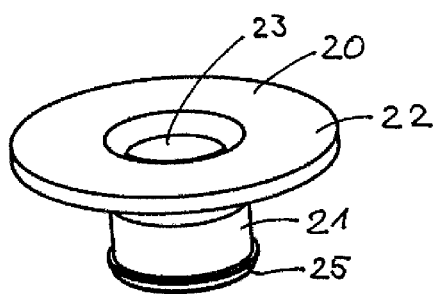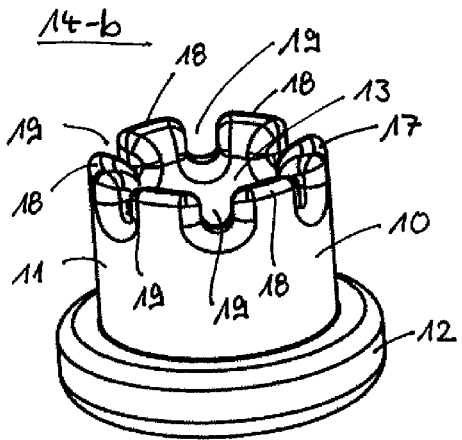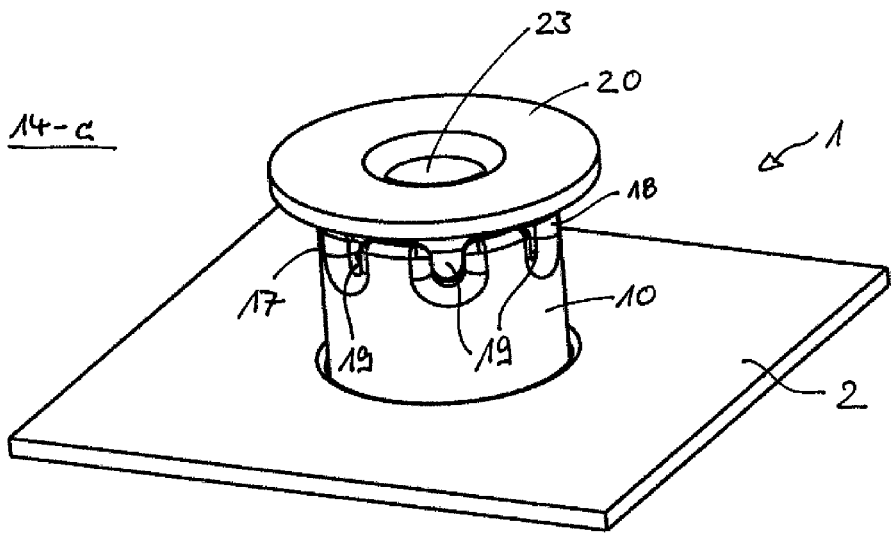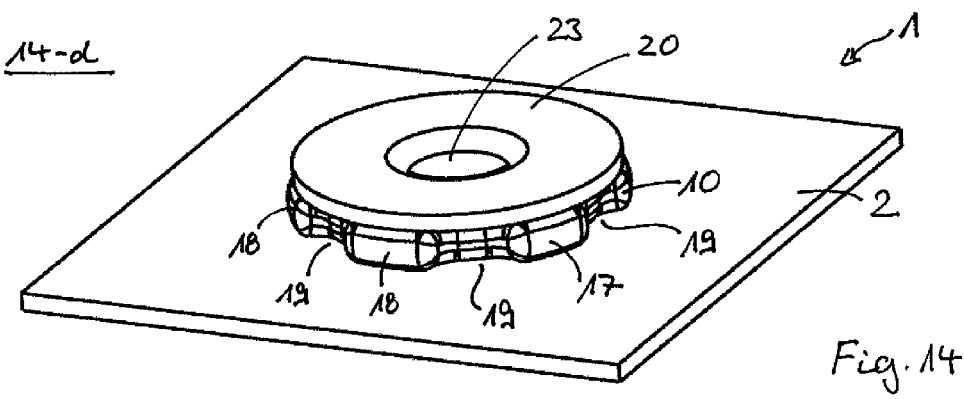
Fig. 14

FASTENING DEVICE FOR A HEAT SHIELD AND METHOD TO PRODUCE THE SAME

BACKGROUND OF THE INVENTION

The present invention relates to a heat shield for shielding of hot areas, e.g. of an internal combustion engine, and a method to produce such heat shield.

Such heat shields for instance in engines of vehicles, in particular in the area of the exhaust line, serve for the protection of temperature-sensitive parts or assemblies from non-permissible overheating, which parts or assemblies are located close to hot parts. This way, the heat shields also improve sound protection. It is important to make sure that the transmission of sound from the hot part to the heat shield is minimized, especially at the fastening points of the heat shield at the part. If the heat shield is fastened at the hot part or at one of the hot parts, one also has to ascertain that the heat transmission is low.

Usually, such heat shields are three-dimensionally shaped structural parts, which comprise at least one metal sheet layer. The three-dimensional shape of the at least one metal sheet layer usually results from the shape of the parts to be shielded against each other and their distance with respect to one another.

Usually, a heat shield comprises one or several metal sheet layers, which define the contour of the heat shield. It can also be advantageous if additional insulation layers, e.g. compressed particle-based layers, such as mica- or graphite-based layers, or temperature-stable fiber-based material, such as glass fiber-based material, e.g. glass fiber fleece and/or mineral fiber-based material, such as mineral-fiber fleece or temperature-stable paper are arranged between the individual metal sheet layers or adjacent to one or several of the metal sheet layers.

Fastening of the heat shield to the part is usually realized using a point-wise connection. To this end, the metal sheet layer or all of the metal sheet layers can comprise a passage opening, which takes up the fastening element. Screws, bolts, studs with transverse pins or rivets can be used here as fastening elements.

At these fastening points, vibrations from the part, in case of fastening at the hot part also heat, can be transmitted via the fastening element from the part to the heat shield. Therefore, the fastening element needs to be isolated and/or dampened relative to the adjacent metal sheet layer(s) through which it passes.

SUMMARY OF THE INVENTION

It is therefore the object of the present invention to provide for a heat shield and a respective production method for such heat shield where the fastening point of the heat shield at the part is improved, in particular where the dampening between the fastening element and the heat shield is improved with low demand in material.

This object is achieved by the heat shield according to the claims. Advantageous embodiments of the heat shield according to the invention are given in the dependent claims.

The heat shield according to the invention in the same way as the heat shields in the state of the art comprises at least one metal sheet layer, it may however also comprise several metal sheet layers. This at least one metal sheet layer comprises a first and a second surface. At its at least one fastening point towards the part, the metal sheet layer comprises a passage opening which takes up the fastening element. The fastening element is surrounded by a sleeve, which passes through the passage opening or penetrates the passage opening.

According to the invention, an additional decoupling element made from flexible material is arranged between the circumferential edge of the passage opening and the sleeve. The decoupling element this way contacts the inner edge of the passage opening as well as the areas of the upper and lower side of the heat shield which immediately adjoin to the passage opening. Silicon or wire mesh, in particular knitted wire mesh, most preferably from steel or stainless steel are particularly suited as flexible material.

Both the sleeve and the decoupling element each comprise an annular shank area in the area of the passage opening. At their respective ends above and below the metal sheet layer, they comprise a first collar and a second collar. In its shank area, the sleeve in the area of the passage opening shows a constant wall thickness. Towards the direction of the first collar, this wall thickness increases outwardly, so that a transition area is realized between the shank area and the first collar on the outside of the sleeve. This transition area shows an increased wall thickness with the increase being realized radially outward. It is for instance rounded or inclined. The first collar of the sleeve extends beyond the first collar of the decoupling element in the radial direction. The transition area preferably shows a radius or a steady inclination, which serves as a shaping aid for the first collar of the decoupling element.

It is in general preferred if the sleeve shows a rotationally symmetric shape so that the transition area in all circular segments of the sleeve shows the same increase of the radial wall thickness. However, for some applications it may be advantageous that for at least one or several of said sections of said transition area showing an increased radial wall thickness, these transition areas shows an increased radial wall thickness compared to the wall thickness of the respective section of the shank area in the region of the passage opening. The comparison of the wall thickness here can be defined in two different ways. On the one hand, one can consider the circular segments of the sleeve and compare the thickness in the correlated circular segments in the shank area and in the area of the transition area. On the other hand, one can consider the axial direction of the passage opening. Starting at the section of the transition area showing the increased radial wall thickness, one moves in the or parallel to the axial direction of the passage opening and compares the wall thickness of the correlated shank area. In order to further improve the present invention, if the transition region is designed essentially straight and inclined, it is preferable to implement the inclination such, that the essentially straight region and the axial direction of the passage opening (resp. the direction of extension of the sleeve shank through the passage opening) enclose an angle $\beta$, wherein $30° \leq \beta \leq 60°$, preferably $40° \leq \beta \leq 50°$.

In order to further improve the present invention, if the transition region is designed as a section of a circular arc for a sleeve having a outer diameter between 6 and 16 mm, it is preferable to implement the arc such, that the arc has a radius R, wherein $3.5 \text{ mm} \leq R \leq 6 \text{ mm}$, preferably $3.5 \text{ mm} \leq R \leq 4.5 \text{ mm}$.

As an additional or alternative measure, in order to further improve the present invention, the height H of the transition area as measured in the axial direction of the passage opening preferably is between 25% and 75% (exclusive or inclusive of these boundary values) of the outer diameter of the shaft of the fastening element, e.g. a screw, or of the inner diameter of the sleeve.

Realizing the fastening point of a heat shield according to this inventive design has the advantage that the sleeve, which in its passage opening is to take up the fastening element, e.g. a screw, is also dampened relative to the circumferential edge of the passage opening in the metal sheet layer. This way, after mounting of the heat sheet on the part, the part is also decoupled against the heat shield. It is particularly advantageous that this complete dampening of the fastening means and the sleeve against the metal sheet layer of the heat sheet is realized using only two parts per fastening point. This low demand in material together with the simple production technique leads to considerable advantages with respect to cost in the production of the heat shield according to the invention.

The design of the shape of the sleeve further allows to individually set and adapt the geometry of the decoupling and therefore also the dampening characteristics. This way it is possible to predetermine the dampening characteristics of the decoupling element by varying the design of the transition area between the shank and the first collar of the sleeve, e.g. as continuous or step-wise radial transition, as a linear inclination or the like.

It is additionally advantageous with the heat shield according to the invention that the sleeve and the decoupling element can be installed symmetrically relative to the metal sheet layer, so that it can be installed from both sides. No particular fastening means are required for the fastening on the hot part, in particular no special screws or the like. Customary screws with our without screw bolt are sufficient. Washers are not required, neither. Using simple fastening means without collar or washer or the like finally also allows to considerably reducing the installation space.

Although the preceding paragraphs only mentioned a single metal sheet layer and its passage opening for taking up the fastening element, the heat sheet may also comprise several metal sheet and other layers, which have a common passage opening which extends through all layers. What has been laid out for the one-layered heat sheet thus far is generally valid for the entire heat sheet in case of a multi-layer heat shield. This also applies for the following description except for the passages which are explicitly mentioned as only affecting heat shields consisting in only one metal sheet layer.

The invention in particular also relates to a method for the production of the heat shield according to the invention. This method for the production of a heat shield is characterized in that a decoupling element made from flexible material is inserted into the passage opening. This decoupling element comprises an annular shank area which passes through the passage opening, a deformable protrusion which after insertion protrudes over the first surface of the metal sheet layer and a second collar which on the second surface of the metal sheet layer extends radially outward relative to the circumferential edge of the passage opening. A sleeve is taken up in the passage opening of the shank area of the decoupling element. This sleeve comprises a) an annular shank area, which passes through the passage opening, b) a first collar, which on the first surface radially to the circumferential edge of the passage opening extends outwardly and c) a second collar, which adjacent to the second surface radially to the circumferential edge of the passage opening extends outwardly. During this insertion, where the decoupling element and the sleeve area preferably inserted from opposite surfaces of the heat shield, the protrusion of the decoupling element is compressed between the first surface of the metal sheet layer and the first collar of the sleeve in order to form the first collar of the decoupling element on the first surface, so that the first collar of the sleeve extends radially over the first collar of the decoupling element. Here, the sleeve in that part of its shank area which comes to lie in the passage opening shows a constant wall thickness, while its transition area between this shank area lying in the passage opening and its first collar at least in sections shows a wall thickness which is increased outwardly compared to the constant wall thickness mentioned beforehand. Due to this, the transition area compared to the first collar and to the shank area in the passage opening at least in sections runs chamfered or beveled. It is thus possible to insert a decoupling element from flexible material into the passage opening which decoupling element already comprises an annular shank area and a deformable protrusion, which in the installed state protrudes beyond the first surface of the metal sheet layer. In the area of the decoupling element which protrudes beyond the second surface of the metal sheet layer, this decoupling element comprises a second collar, which extends on the second surface of the metal sheet radially outward from the passage opening.

Thus, in order to form the fastening point, a sleeve is inserted into the passage opening of the shank area of the decoupling element. This sleeve also comprises an annular shank area with a passage opening, which then after complete mounting of the sleeve and the decoupling element can take up a fastening element, e.g. a screw. On its side facing the first surface of the metal sheet layer, the sleeve comprises a first collar, which extends radially outwardly. On the opposite side, which faces the second surface of the metal sheet layer, it comprises a second collar. This collar extends radially outwardly, too.

During the insertion of the sleeve into the passage opening of the decoupling element, the deformable protrusion is deformed outwardly by the first collar of the sleeve. As the sleeve comprises a radially-broadened transition area between shank and first collar, the deformable protrusion is not simply compressed, but an outward deflection takes place, through which the first collar of the decoupling element is formed. This deflection is superimposed by a three-dimensional compression of the decoupling element.

The sleeve is inserted through the passage opening of the shank area of the decoupling element in such a manner that its second collar protrudes beyond the second collar of the decoupling element. This way, the sleeve is fixed in the passage opening of the decoupling element and the decoupling element is fixed in the passage opening of the metal sheet layer. This engagement is sufficient as the only fixation between the sleeve and the decoupling element. The second collar of the decoupling element other than the first collar of the decoupling element has been formed prior to its insertion.

Using a modification of the radial outer transition area between the shank area and the first collar of the sleeve, it is in particular possible to predetermine or adapt the degree of deformation, the degree of compression and the general outer shape of the decoupling element and therefore also its dampening behavior. The parameters to be modified are the degree of rounding or beveling as well as the degree of thickness increase of this transition area of the sleeve.

It is particularly advantageous if the deformed protrusion of the decoupling element at its edge comprises an inclined insertion surface for the sleeve with the inclined surface extending along the inner circumferential edge of the passage opening of the decoupling element. It is preferred that this inclined insertion surface shows a steady inclination. This inclined insertion surface is however not mandatory.

The sleeve is preferably shaped such that it is able to penetrate and deform the decoupling element on its own.

The heat shields according to the invention can be produced using the aforementioned method.

The transition area between the shank area and the first collar of the sleeve on at least 90% of its radial, thus circumferential extension advantageously shows a distance to the metal sheet layer, in particular to the circumferential edge of the passage opening of the metal sheet layer, which is larger than or equal to the material thickness of the shank area of the decoupling element in the area of the passage opening. This way it is ascertained that the decoupling element is regularly deflected outwardly in the transition area.

The transition area between the shank area and the first collar of the sleeve may extend in a rounded manner, with the rounding advantageously being present on at least 90% of the circumferential extension of the transition area with a radial radius of curvature, which is larger than the thickness of the material of the shank area of the decoupling element in the area of the passage opening.

In order to lock the second collar of the sleeve in place, the decoupling element in the area of its second collar may comprise an offset. This causes that the inner diameter of the decoupling element in this area of the offset is larger than the inner diameter of the decoupling element in the area of the passage opening. The second collar of the sleeve may also engage with this offset and this way the sleeve can be fixed on the second surface of the metal sheet layer.

The decoupling element is preferably made from wire knitting, other wire-based mesh structures or from silicone with wire knitting made from stainless steel being preferred.

The free end of the decoupling element which is to be finally shaped by interaction with the sleeve does not need to be cylindrical with constant length. Considering the free end of the decoupling element in the radial direction, it may rather have alternating sections with different length. Thus, the free end may look as with pinnacles or comparable to the edge of a crown cap. When forming the first collar at this free edge, only the projections are deflected outwardly by the sleeve, while the recesses between them compensate for the increasing diameter. This way, the first collar of the decoupling element can be formed without increasing the tension in the decoupling element so that it maintains its elasticity.

As already mentioned earlier, the dampening characteristics of the decoupling element may be individually designed or adapted by varying its shape or by adapting the degree of compression in different areas of the decoupling element. In case of a wire mesh, the characteristics of the decoupling element may also be influenced by the characteristics of the mesh, such as the wire thickness, the width of the mesh etc.

Both the sleeve and the decoupling element can each be realized as one-piece and annularly self-contained, so that the passage opening is only penetrated by one sleeve and one decoupling element. No additional elements are required. This results in a fastening point of the heat shield which is extremely cost-efficient and which can be produced with low assembly cost. The wall of the sleeve preferably has no recesses—neither on the inside nor on the outside—so that its production is simple, too.

The passage opening through the metal sheet layer and/or the shank area of the sleeve and/or the shank area of the decoupling element may have a circular cross section. However, for each of these elements, either individually or in combination of two or all of them, all other cross-sectional shapes, in particular oval or elliptic cross-sectional shapes in the plane of the metal sheet layer are possible as well. This way, an adaptation of the fastening point to the three-dimensional conditions given e.g. in the heat shield and/or the part to which the heat shield is to be fastened, is possible. Non-circular passage openings may be used in order to balance out tolerances or changing length due to temperature changes.

In any case of a non-circular opening, any reference in the present document referring to the diameter of said non-circular opening, e.g. of the passage opening, the sleeve or any other element except for the screw, then refers to the minimum of diameters that may be measured in said opening.

For an improved decoupling between fastening element and metal sheet layer of the heat shield, the first collar and/or the second collar of the decoupling element cover the edge of the passage opening of the metal sheet layer over an area with a width which corresponds to more than 40%, preferably to more than 50% of the wall thickness of the decoupling element in the area of the passage opening. This way, a sufficient decoupling and a sufficient fastening of the decoupling element in the passage opening is achieved.

Advantageously, the circumferential edge of the passage opening is chamfered on one or both sides. It is in particular that edge of the passage opening which results on the first surface of the metal sheet layer, which is angled and bent upwardly from the plane, in which the metal sheet layer extends at the outer edge of the decoupling element, preferably with an angle between 30° and 75°. The chamfered or angled edge of the passage opening can advantageously be taken up in a groove at the outside of the decoupling element.

In the following, some examples of heat shields according to the invention are given. Here, the same or similar reference numbers are used for identical or similar elements, so that their description in part is not repeated. In each of the following examples, one or several advantageous characteristics are shown in combination. These may however also improve the present invention in an isolated manner, thus not in combination with the other advantageous characteristics of the respective example.

BRIEF DESCRIPTION OF THE DRAWINGS

It is shown in

FIGS. 1a-1e: The assembly of a heat shield according to the invention in partial view;

FIGS. 2a-2b: The radial cross-section of various sleeves in heat shields according to the invention;

FIGS. 3a-3b: The radial cross-section of various decoupling elements prior to mounting in a heat shield according to the invention;

FIGS. 14a-14d: The fastening point of a further heat shield according to the invention.

DETAILED DESCRIPTION OF THE INVENTION

Figure 13:
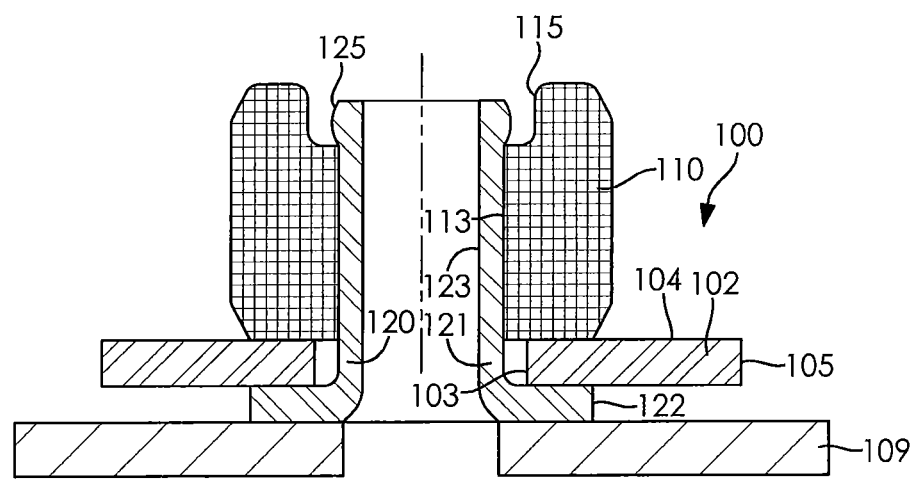
FIG. 13: The fastening point of a conventional heat shield (prior art)

FIG. 13 shows a conventional heat shield 100 with a metal sheet layer 102. This metal sheet layer 102 comprises a first surface 104, its upper surface, and a second surface 105, its lower surface. The heat shield 100 in its passage opening 103 for fastening means comprises a sleeve 120 which allows the fastening of this metal sheet layer 102 at a heat-emitting and/or sound-emitting part 109. This sleeve 120 comprises a first flange 122, which extends between the part 109 and the metal sheet layer 102 and engages behind the passage opening 103 to the outward. Starting at this flange 122, the sleeve comprises a shank area 121, which passes through the passage opening 103 and further protrudes over the first surface 104. At the end of the shank area 121, the sleeve 120 comprises a second flange 125.

On the first surface 104 of the metal sheet layer 102, a decoupling element 110 is arranged, which comprises a passage opening 113, the inner diameter of which corresponds to the outer diameter of the shank area 121 in the adjacent area. The sleeve 120 is guided through this passage opening 130 and with its second flange 125 reaches beyond the recess 115. This way, the decoupling element is fixed on the first surface 104 and adjacent to the sleeve 120. The decoupling element 110 does not reach through the metal sheet layer 102. Unfortunately, at this fastening point of the heat shield 100, both heat and vibrations are radially transmitted from the part 109 via the first sleeve 122 of the sleeve 120 to the metal sheet layer. Only an axial decoupling is realized.

FIG. 1 shows a section of a heat shield 1 with one metal sheet layer 2 in the area of a fastening point in cross-section. In FIG. 1-a, this fastening point is shown with its metal sheet layer 1 and the decoupling element 10 prior to the complete assembly. The decoupling element 10 with its shank area 11 penetrates the passage opening 3 and on its own shows a passage opening 13. The decoupling element 10 is arranged on the second surface 5 of the metal sheet layer 2 by its collar 12. This collar 12 on the lower end of its inner circumference shows a recess 15, where the inner diameter of the passage opening 13 of the decoupling element 10 is enlarged compared to the shank area 11. On the first surface 4 of the metal sheet layer, the decoupling element 10 comprises an axial protrusion 16, which forms a compressible area. At its free end, the compressible area 16 is rounded on the inside, so that an inclined insertion surface 14 for the sleeve results, which sleeve is to be inserted subsequently.

Figure 10A:
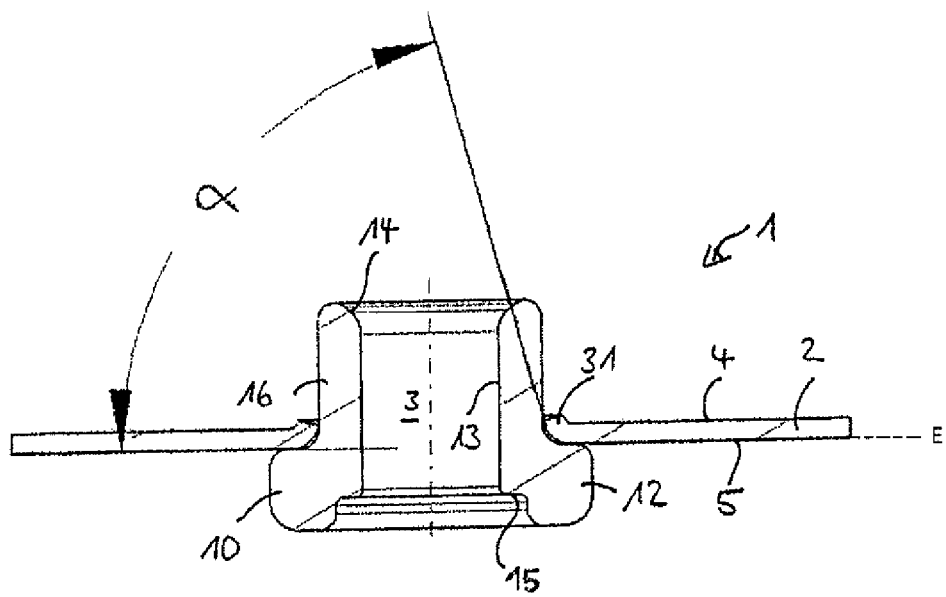
FIGS. 10a-10b: Two variants of the fastening point of a heat shield according to the invention without a sleeve prior to mounting.
Figure 10B:
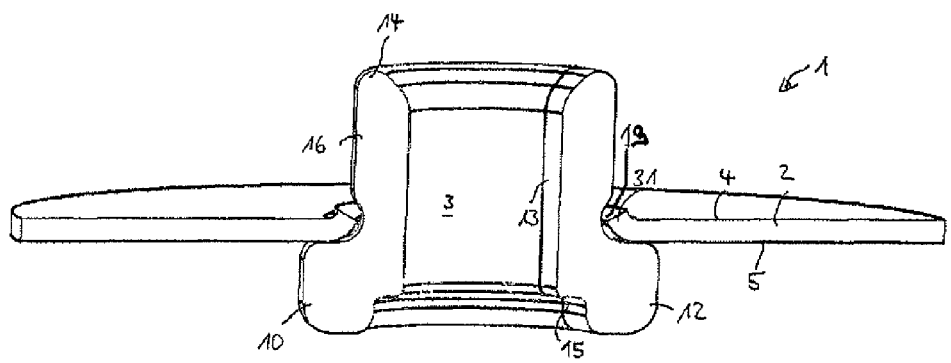

A further advantageous characteristic is shown in FIG. 1-a, namely that the circumferential edge of the passage opening 3 is chamfered on the first surface 4, with the chamfering 30 being further explained in the context of FIG. 10.

In FIG. 1-b, the insertion of the sleeve 20 into the passage opening 13 of the decoupling element 10 is illustrated. The sleeve comprises a shank area 21 and a first collar 22. This collar is designed relatively broad. The transition area between the shank 21 and the first collar 22 is designed as a thickened area 27 with a radius 24. During the further insertion of the sleeve into the passage opening 13 of the decoupling element 10, this radius serves as deflection aid for the compressible area 16 of the decoupling element 10. On its other edge, the sleeve 20 shows a small second collar 25, which aims on the fixation with the recess 15 of the decoupling element 10. The radial protrusion of this second collar 25 beyond the shank area 21 amounts to at the most 20% of the radial protrusion of the first collar 22 over this shank area 21.

The sleeve 20 comprises a passage opening 23, which severs for the insertion of a fastening element, e.g. of a screw.

In the present sleeve 20, the radius 24 on the outer side of the transition area between shank 21 and first collar 22 and the radius 26 on the inner side of the transition area between shank 21 and first collar 22, are designed in such a way that the transition area comprises a thickened area 27 with a radius. The radius 26 here results as the usual radius at the inner edge of the collar 22 which results from forming the flange, while the radius 24 is deliberately formed more pronouncedly than would be anyway required for the edge on the outer side.

FIG. 1-c shows the passage of the sleeve 20 through the passage opening 13 of the decoupling element 10. Here, the sleeve 20 is inserted to such a degree that the thickened area 27 presses against the deformable area 16 of the decoupling element 10, so that it starts to deflect this area outwardly. In FIG. 1-d, this deflection is explicitly illustrated, as the deformable area 16 has already been considerably deflected outwardly. In both figures, it is obvious that the rounded shape 14 of the inner edge of the deformable area 16 serves as insertion aid for the sleeve 20.

In FIG. 1-e, the completely assembled state is shown. The deformable area 16 is now deflected to give the first collar 17. The decoupling element 10 now completely surrounds the circumferential edge of the passage opening 3 and this way decouples the metal sheet layer 2 from the sleeve 20 and therefore also from a fastening element to be inserted into this sleeve as well as from the part at which the heat shield is fastened via the fastening element taken up in the sleeve 20. As the circumferential edge of the passage opening 3 in the layer 2 is inclined or chamfered on the side of the first surface 4, the deflection of the decoupling element can be improved and/or facilitated.

In this example, the radius 24 is larger than the thickness of the decoupling element 10 in its shank area 11 inside of the passage opening 3. This way, the deformation of the decoupling element is essentially a deflection is superimposed by a very small compression of the area 16 as well as of the transition area between the shank area 11 and the first collar 17, only.

FIG. 2 shows the cross-section through various sleeves for a heat shield according to the invention; in each case, only the right halve of the cross section is given. In the sleeve shown in FIG. 2-a, the second collar 25 is realized essentially orthogonally, while in FIG. 2-b it is inclined which allows a facilitated passage through the passage opening 13 of the decoupling element 10. Further, the transition region on the outer side between the shank 21 and the first collar 22 in FIG. 2-a in the central range is designed essentially straight.

Generally, in order to further improve the present invention, if the transition region is designed essentially straight and inclined, it is preferable to implement an inclination such, that the essentially straight region and the axial direction of the passage opening 23 (resp. the direction of extension of the shank 21 through the passage opening 13) enclose an angle β, as shown in FIG. 2-a, between 30° and 60°, preferably between 40° and 50°, exclusive or inclusive of these boundary values.

The curvatures are essentially located at the beginning and at the end of this straight area 24. Nevertheless, overall a radial thickening results as the course of the transition area, starting at the shank area 21 and extending up to the first collar 22.

As an additional or alternative measure, in order to further improve the present invention, the height H, as shown in FIG. 2-a, of the transition area as measured in the axial direction of the passage opening 23 preferably is between 25% and 75% (exclusive or inclusive of these boundary values) of the outer diameter of the shaft of the fastening element, e.g. a screw 8, or of the inner diameter of the sleeve 20.

In FIG. 2-b, this transition area is realized as a section of a circular arc with the radius 24 been chosen appropriately for the respective application.

Generally, in order to further improve the present invention, if the transition region is designed as a section of a circular arc, it is preferable to implement the arc such, that the arc has a radius R, as shown in FIG. 2-b, between 3.5 mm and 6 mm, preferably between 3.5 and 4.5 mm, exclusive or inclusive of these boundary values with the diameter of the screw 8 preferably between 4 mm and 10 mm.

Here in FIG. 2-b, again, the radial wall thickness increases in the direction towards the collar 22. It is however essential that both embodiments show a steady course of the transition area, thus that the wall thickness steadily increases outwardly in the course of the transition area in the direction away from the metal sheet layer 2, which means downwardly in the sectional views given in FIG. 2.

The double arrows in FIG. 2-b indicate that in case of a non-circular shape of the sleeve 20, the increase of the thickness of the wall of the sleeve has to be measured at one section in a plane which is defined by the axial direction of the sleeve—which is indicated by the dash-dotted line in the passage opening 23 or by a parallel line to this which is indicated by the dashed arrow—on the one hand and by the orthogonal line to the axis of the passage opening 23 pointing outwardly to the edge of the sleeve 20. The two double arrows indicate the smaller thickness in the shank area 21 of the sleeve and the larger thickness in the transition area 27.

FIG. 3 shows two cross-sections of decoupling elements 10, which can be used in the heat shields 1 according to the invention; again, only the right halves are depicted. These cross-sections show the decoupling elements 10 prior to the assembly, thus with a deformable area 16, which is not yet deflected. In FIG. 3-a, the deformable area 16 shows an inclined insertion section 14 for the sleeve. In FIG. 3-b, the corresponding area is rounded.

Figure 4:
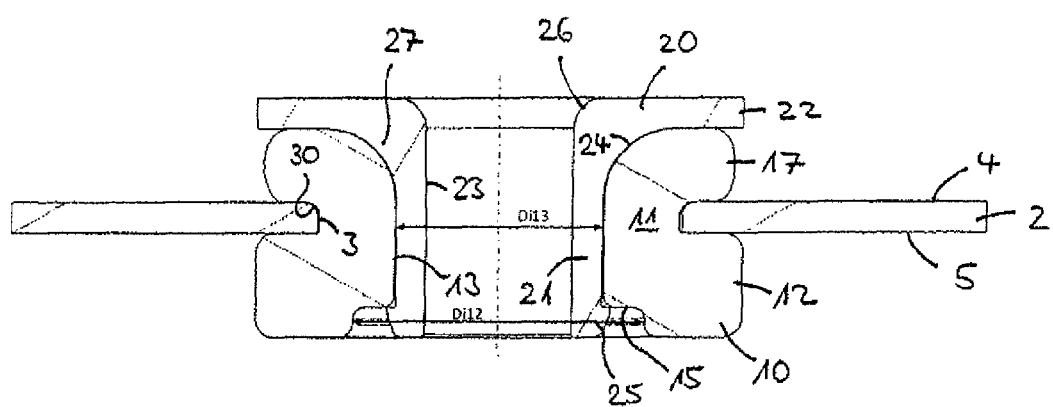
FIGS. 4a-4b: Fastening points of two different heat shields according to the invention.

FIG. 4 shows the fastening points of various heat shields according to the invention in a cross section. FIG. 4-a illustrates a fastening point using a sleeve 20 similar to the sleeve 20 shown in FIG. 2-a, whereas FIG. 4-b shows a fastening point where a sleeve 20 is used, as it is given in FIG. 2-b. The shape of the transition area 27 of the sleeve determines the shape of the adjacent area of the decoupling element 10. FIG. 4-b further makes clear that the decoupling element 10 in the area of its second collar 12 in sections, namely at its free end, shows an inner diameter Di12, which due to the recess 15 is larger than the inner diameter Di13 in the area of the passage opening 3 of the heat shield 1.

Figure 5:
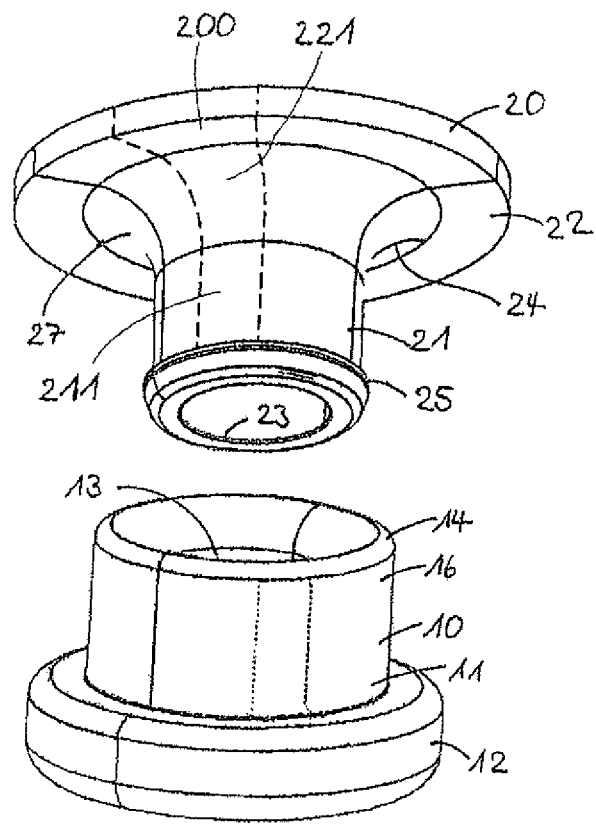
FIG. 5: A decoupling element and a sleeve prior to mounting of a heat shield according to the invention.

FIG. 5 shows a sleeve 20 and a decoupling element 10 immediately before their assembly. The sleeve 20 is designed as in FIG. 2-b. The decoupling element 10 corresponds to the decoupling element 10 in FIG. 3-b.

FIG. 5 further indicates that the increase of the thickness of the sleeve 20 can be measured by comparison of the transition area 221 and the shank area 211 in a circular section 200 of the sleeve 20 in case the sleeve 20 other than in the example depicted is not axially symmetric.

Figure 6:
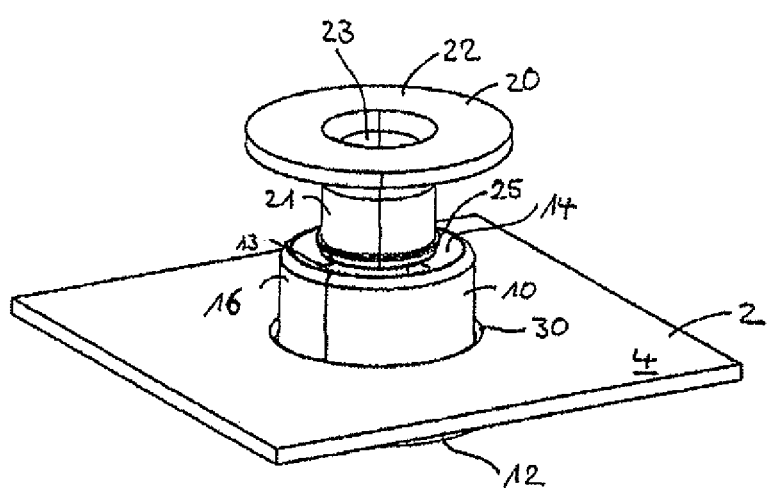
FIG. 6: The fastening point of a heat shield according to the invention prior to mounting.

FIG. 6 shows a top-view to a fastening point of a heat shield 1 using the sleeve 20 and the decoupling element 10 from FIG. 5. One can immediately realize how the second collar 25 of the sleeve 20 is inserted into the passage opening 13 of the decoupling element 10 by passing via the inclined insertion section 14.

Figure 7:
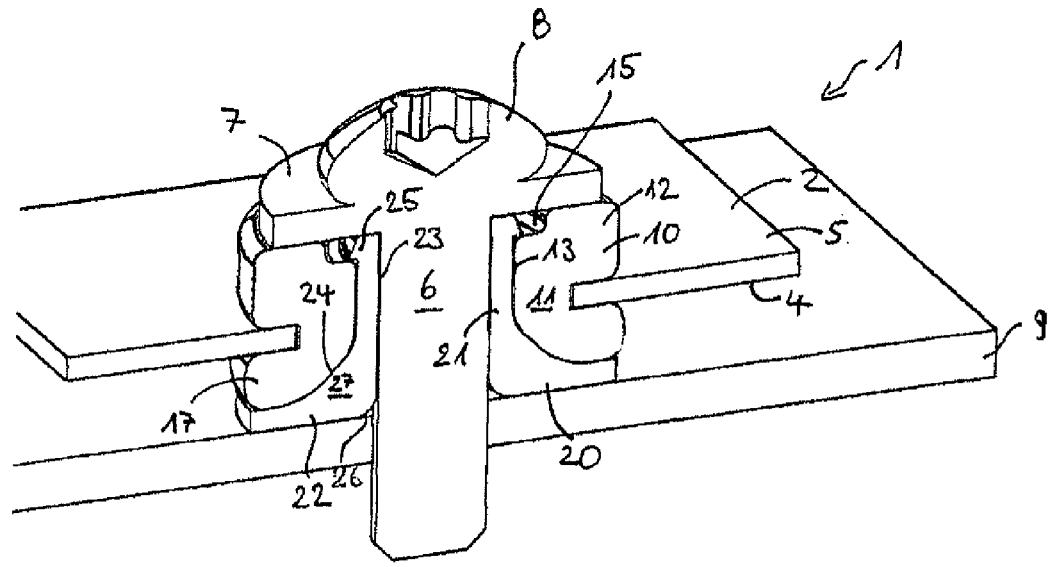
FIGS. 7 and 8: The fastening points of different heat shields according to the invention including a screw as fastening element with different orientation of sleeve and decoupling element.

FIG. 7 in a cross-sectional view shows the fastening point of a heat shield 1 in the assembled state. Other than in the other figures, the part 9, to which the heat shield is mounted, is shown, too. At this fastening point, the sleeve 20 is inserted into the decoupling element 10 from the surface of the heat shield facing the part 9. The decoupling element 10 is inserted from the opposite surface of the heat shield. The screw 8 inserted from the second side 5 has a collar 7 and with this collar 7 rests against the sleeve 20 in the area of the second collar 25 of the sleeve and against the decoupling element 10 in the area of the second collar 12 of the decoupling element 10. The sleeve 20 here with its first collar 22 rests on the adjacent part 9, which is here explicitly shown. By means of the wire mesh knitting of the decoupling element 10, the metal sheet layer 2 is completely decoupled from the sleeve 20, the screw 8 and the part 9, so that in the direction orthogonal to the plane of the layer 2 as well as in the radial direction of the passage opening 3, a dampening both of the heat transfer and of the vibration transmission results. The embodiment has no chamfering 30 at the inner edge of the passage opening 3.

Figure 8:
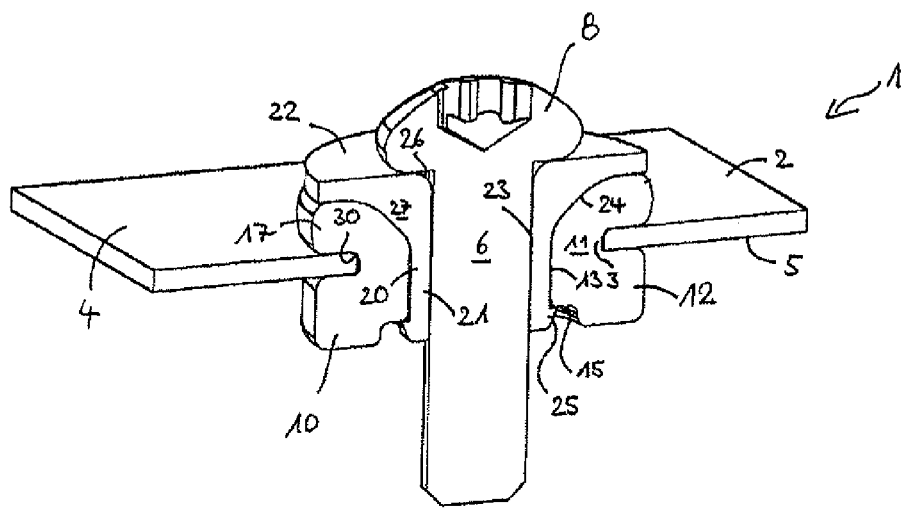

In FIG. 8, a further example for a fastening point of a heat shield 1 according to the invention is illustrated. Now, the sleeve 20 with its first flange 22 is inserted from the first side 4, which points away from the part 9, into the wire mesh knitting acting as decoupling element 10. The screw 8 with its head rests on this broad flange 22, so that a broad collar of the screw, such as it was used in FIG. 7, can be desisted from, so that less building space is required. As in FIG. 7, the screw 8 and the sleeve 20 are completely decoupled from the metal sheet layer 2 through the decoupling element 10 both in the radial direction and axially.

Figure 9:
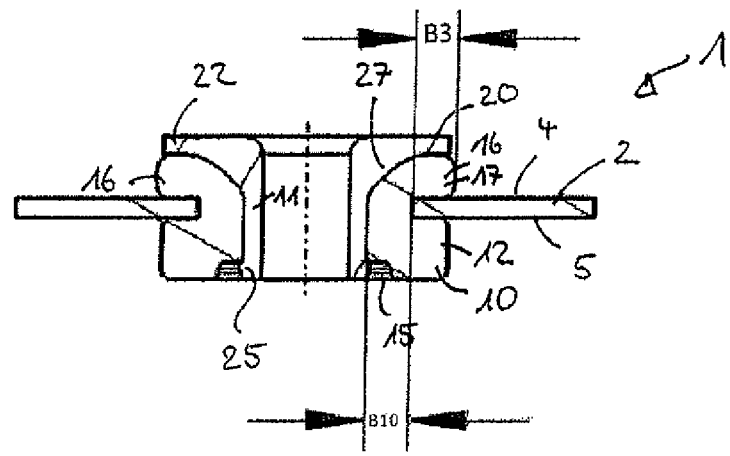
FIG. 9: The fastening point of a heat shield according to the invention in a cross-section.

FIG. 9 shows a further fastening point of a heat shield 1 according to the invention in cross-section. In FIG. 9 it is illustrated that the radial protrusion of the deformable area 16 and of the first collar 17, respectively, beyond the layer 2 in the radial direction starting at the passage opening 3 and its circumferential edge, shows a width B3 in the radial direction, which is larger than 50% of the width B10 of the decoupling element 10 in its shank area 11 located in the passage opening 3. To be more precise, B3 corresponds to approximately 95% of the width B10.

FIG. 10 shows two further examples of fastening points of heat shields 1 according to the invention prior to complete assembly of the fastening point without the sleeve 20 which is required for the complete assembly.

In both examples, the edge of the layer 2 starting at the side to which the second flange 12 of the decoupling element 10 rests and which spans the layer E, is bent in the direction of the surface situated opposite to the layer 2 so that it crooks upwardly. Here, in a first variant, the entire edge can be circumferentially bent upwardly whereas in a second variant, the edge can be provided with alternatingly protruding and recessed sections, where only the protruding sections are bent upwardly. As an alternative, a chamfering with the identical effect could be given. The bending 31 of the circumferential edge of the passage opening 3 or of sections of the circumferential edge can for instance be introduced into the metal sheet layer 2 by a suited realization of the forming process of the metal sheet layer 2. Advantageously, this results in an inclination of the second surface 5 of the metallic layer 2 with an angle between 30° and 75° relative to the plane, in which the metal sheet layer extends at the outer edge of the decoupling element 10 and outside of this bending 31. In the example of FIG. 10-*b* on the outer edge of the decoupling element 10, an additional groove 19 is provided, into which the bent edge 31 of the circumferential edge is taken up.

Figure 11:
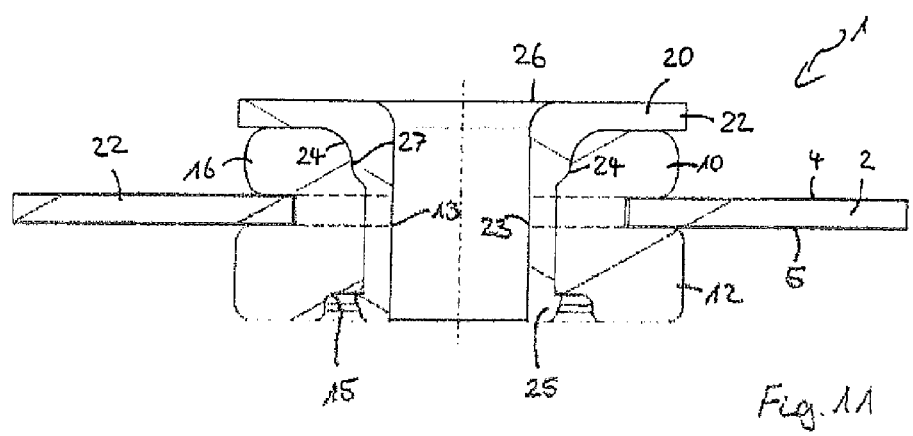
FIGS. 11 and 12: The fastening points of various heat shields according to the invention in cross-section.

FIG. 11 shows a further fastening point of a heat shield 1 according to the invention. In contrast to the preceding examples, the thickened area 27 has a particular design. Starting at the shank area located in the passage opening 3, the shank area in the direction towards the first flange 22 is first thickened before it passes into a radial transition area towards the first flange 22.

Figure 12:
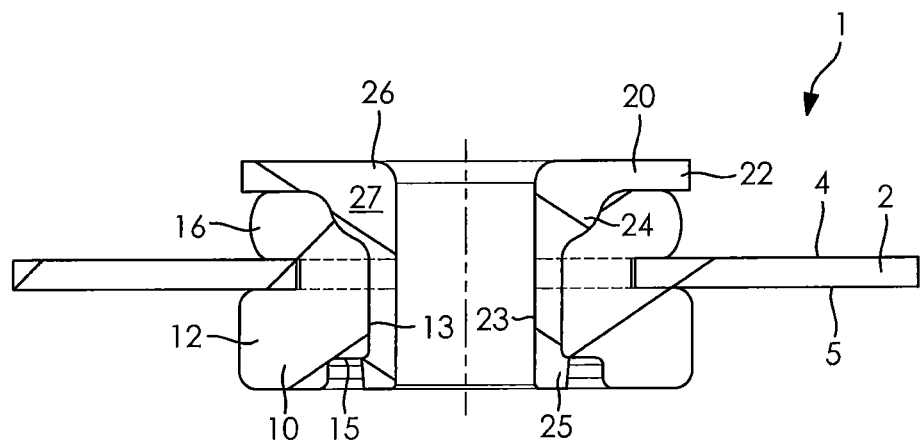

In FIG. 12, a further fastening point of a heat shield 1 according to the invention is shown. The thickening of the area 27 is even more pronounced in this example. The dampening characteristics of the decoupling element 10 can be individually set by choosing the cross-sectional shape of this transition area between shank 21 and first collar 22.

Both in FIG. 11 and in FIG. 12, the inner edge of the passage opening 3 of the heat shield 1 is straight, thus it is realized without chamfering. FIGS. 11 and 12 further illustrate that the shank area 21 of the sleeve 20 in the area of the passage opening 3, which in both figures is delimited by dashed lines, extends with constant wall thickness.

FIG. 14 shows a further fastening point according to the invention. It comprises a sleeve 20 as displayed in FIG. 14-*a*. This sleeve 20 corresponds to the sleeve 20 as shown in FIG. 5. Further a decoupling element 10 is provided as in FIG. 5. Different to the decoupling element in FIG. 5, the decoupling element 10 in FIG. 14 at its first collar 17 comprises projections 18 and recesses 19, only some of which are designated with a reference sign for better readability of FIG. 14. Besides said projections 18 and recesses 19, the sleeve 20 and the decoupling element 10 are the same as in FIG. 5. The alternation of projections 18 and recesses 19 at the free end of the decoupling element 10 facilitates the deformation of the decoupling element 10 required to provide the first collar 17. This is mainly the case since only the projections 18 are deflected outwardly by the interaction with the transition area 27 of the sleeve 20.

FIG. 14-*c* shows a metal sheet 2, the decoupling element 10 and the sleeve 20 before assembly. FIG. 14-*d* shows the metal sheet 2, the decoupling element 10 and the sleeve 20 after assembly. Here, it is obvious that the recesses 19 between the projections 18 increase outwardly. This means that no radial tension is introduced into the first collar 17 as the projections 18 have not been stretched radially. This facilitates the forming of the first collar 17 and increases the stability and elasticity of the first collar 17 and therefore of the decoupling element 10 as a whole.

The invention claimed is:

1. A heat shield for shielding hot areas of a combustion engine comprising at least one metal sheet layer with a first and a second surface, with the at least one metal sheet layer comprising at least one passage opening for the passage of a fastening element, and a sleeve, which passes through the passage opening, wherein
    a decoupling element from flexible material is arranged between a circumferential edge of the passage opening and the sleeve, where the decoupling element and the sleeve each comprise;
      a) an annular shank area, which penetrates the passage opening,
      b) a first collar, which on the first surface extends radially outward relative to the circumferential edge of the passage opening, and
      c) a second collar, which extends adjacent to the second surface radially outward relative to the circumferential edge of the passage opening,
    where the first collar of the sleeve radially extends over the first collar of the decoupling element,
    where the sleeve in a shank area in the region of the passage opening shows a constant wall thickness and a transition area between the shank area in the region of the passage opening and the first collar at least in sections shows a radial wall thickness that is radially outwardly increased relative to the area at the passage opening,
    so that the transition area between the shank area in the region of the passage opening and the first collar at least in sections extends rounded or inclined;
    wherein the transition area between the shank area and the first collar of the sleeve on at least 90% of a circumferential extension shows a distance to the metal sheet layer, which is larger than the material thickness of the shank area of the sleeve in the area of the passage opening.

2. The heat shield according to claim 1, wherein at least one of said sections of said transition area shows an increased radial wall thickness, each of these transition areas shows an increased radial wall thickness compared to the wall thickness of the respective section of the shank area in the region of the passage opening, with the section of the transition area and the respective section of the shank are being located in the same circular segment of the sleeve.

3. The heat shield according to claim 1, wherein the decoupling element in the area of the second collar comprises an inner diameter (Di12) which is larger than the inner diameter (Di13) in the area of a passage opening of the decoupling element.

4. The heat shield according to claim 1, wherein the decoupling element is composed of metal wire mesh or silicone.

5. The heat shield according to claim 1, wherein the first collar of the decoupling element is radially formed towards an outside between the metal sheet layer and the first collar of the sleeve.

6. The heat shield according to claim 1, wherein the first collar of the decoupling element comprises compressed sections, where different compressed sections may have a different degree of compression.

7. The heat shield according to claim 1, wherein the shank area wall of the sleeve shows no recesses on an outer or inner circumference.

8. The heat shield according to claim 1, wherein the annular shank area of the sleeve comprises a circular, oval or elliptic cross section in the plane of the metal sheet layer.

9. The heat shield according to claim 1, wherein the second collar of the decoupling element comprises a circumferential recess extending along a passage opening of the decoupling element, where the second collar of the decoupling element engages with the sleeve.

10. The heat shield according to claim 1, wherein the edge of the passage opening of the metal sheet layer on both the first and second surfaces is covered by the decoupling element in the radial direction over a width (B3), which corresponds to at least 40% of the wall thickness (B10) of the decoupling element in the area of the passage opening.

11. The heat shield according to claim 1, wherein the decoupling element realizes a complete decoupling between the metallic layer and the sleeve, and/or or between the metal sheet layer and a heat emitting or sound emitting part, such as orthogonal to the plane of the metal sheet layer and in all directions in the plane of the metal sheet layer.

12. A heat shield for shielding hot areas of a combustion engine comprising at least one metal sheet layer with a first and a second surface, with the at least one metal sheet layer comprising at least one passage opening for the passage of a fastening element, and a sleeve, which passes through the passage opening, wherein
    a decoupling element from flexible material is arranged between a circumferential edge of the passage opening and the sleeve, where the decoupling element and the sleeve each comprise;
        a) an annular shank area, which penetrates the passage opening,
        b) a first collar, which on the first surface extends radially outward relative to the circumferential edge of the passage opening, and
        c) a second collar, which extends adjacent to the second surface radially outward relative to the circumferential edge of the passage opening,
    where the first collar of the sleeve radially extends over the first collar of the decoupling element,
    where the sleeve in a shank area in the region of the passage opening shows a constant wall thickness and a transition area between the shank area in the region of the passage opening and the first collar at least in sections shows a radial wall thickness that is radially outwardly increased relative to the area at the passage opening,
    so that the transition area between the shank area in the region of the passage opening and the first collar at least in sections extends rounded or inclined, wherein the transition area between the shank area and the first collar of the sleeve on at least 90% of its a radial extension shows a radial curvature radius which is larger than the material thickness of the shank area of the sleeve in the area of the passage opening.

13. A heat shield for shielding hot areas of a combustion engine comprising at least one metal sheet layer with a first and a second surface, with the at least one metal sheet layer comprising at least one passage opening for the passage of a fastening element, and a sleeve, which passes through the passage opening, wherein
    a decoupling element from flexible material is arranged between a circumferential edge of the passage opening and the sleeve, where the decoupling element and the sleeve each comprise;
        a) an annular shank area, which penetrates the passage opening,
        b) a first collar, which on the first surface extends radially outward relative to the circumferential edge of the passage opening, and
        c) a second collar, which extends adjacent to the second surface radially outward relative to the circumferential edge of the passage opening,
    where the first collar of the sleeve radially extends over the first collar of the decoupling element,
    where the sleeve in a shank area in the region of the passage opening shows a constant wall thickness and a transition area between the shank area in the region of the passage opening and the first collar at least in sections shows a radial wall thickness that is radially outwardly increased relative to the area at the passage opening,
    so that the transition area between the shank area in the region of the passage opening and the first collar at least in sections extends rounded or inclined, wherein the edge of the passage opening of the metal sheet layer relative to the plane (E), in which the metal sheet layer extends at the outer edge of the decoupling element, is bent by an angle towards the side of the first collars relative to the plane (E).

14. A heat shield for shielding of hot areas of a combustion engine, comprising at least one metal sheet layer with a first and a second surface, where the at least one metal sheet layer comprises at least one passage opening for the passage of a fastening element and with a sleeve, which penetrates the passage opening, wherein the passage opening is only penetrated by the fastening element, the sleeve and a decoupling element from a flexible material,
    where the decoupling element is arranged between a circumferential edge of the passage opening and the sleeve, and
    where the decoupling element and the sleeve each comprise
        a) an annular shank area, which penetrates the passage opening,
        b) a first collar, which on the first surface extends radially outwardly from the circumferential edge of the passage opening, and
        c) a second collar, which extends adjacent to the second surface radially outwardly from the circumferential edge of the passage opening,
    where the first collar of the sleeve extends radially over the first collar of the decoupling element,
    where the sleeve in a shank area in the region of the passage opening shows a constant wall thickness and a transition area between the shank area in the region of the passage opening and the first collar at least in sections has a wall thickness that is increased outwardly relative to the wall thickness in the area at the passage opening,
    so that the transition area between the shank area in the region of the passage opening and the first collar at least in sections extends rounded or inclined,
    wherein said transition area at least in sections extends such that
        a) the height H of the transition area in axial direction of the passage opening in said sections is equal to or larger than 25% or equal to or smaller than 75% of the inner diameter of the shank in the area at the passage opening; or
        b) the transition area is rounded such that said transition area at least in sections has a radius R of curvature between the shank and the first collar being equal to or larger than 3.5 mm and/or equal to or smaller than 6 mm, preferably 3.5 mm≤R≤6 mm; or
        c) the transition area is inclined such, that at least in sections said transition area and the axial direction of the passage opening enclose an angle β equal to or larger than 30° or equal to or smaller than 60°, preferably 30°≤β≤60°.

\* \* \* \* \*